United States Patent [19]

Walling et al.

[11] Patent Number: 4,539,696
[45] Date of Patent: Sep. 3, 1985

[54] TARGET DEVICE FOR AN X-RAY EXAMINATION INSTALLATION

[75] Inventors: Christian Walling, Erlangen; Helmut Schott, Fuerth, both of Fed. Rep. of Germany

[73] Assignee: Siemens Aktiengesellschaft, Berlin & Munich, Fed. Rep. of Germany

[21] Appl. No.: 467,385

[22] Filed: Feb. 17, 1983

[30] Foreign Application Priority Data

Mar. 1, 1982 [DE] Fed. Rep. of Germany ....... 3207328

[51] Int. Cl.³ ............................................. G03B 41/16
[52] U.S. Cl. ..................................... 378/181; 378/175
[58] Field of Search ............... 378/181, 182, 188, 172, 378/173, 175, 176

[56] References Cited

U.S. PATENT DOCUMENTS

| | | | |
|---|---|---|---|
| 3,173,008 | 3/1965 | Barrett et al. | 378/176 |
| 3,832,559 | 8/1974 | Thomas et al. | 378/181 |
| 4,105,920 | 8/1978 | Pury et al. | 378/176 |
| 4,432,095 | 2/1984 | Adelmeyer et al. | 378/181 |

FOREIGN PATENT DOCUMENTS

| | | | |
|---|---|---|---|
| 1949764 | 4/1973 | Fed. Rep. of Germany | 378/181 |
| 2333157 | 1/1975 | Fed. Rep. of Germany | 378/181 |
| 3034282 | 4/1982 | Fed. Rep. of Germany | 378/182 |

Primary Examiner—Craig E. Church
Assistant Examiner—Charles Wieland
Attorney, Agent, or Firm—Hill, Van Santen, Steadman & Simpson

[57] ABSTRACT

A target device for an X-ray examination installation has a cassette carrier which permits loading of an X-ray film cassette therein from the left or the right, the cassette carrier is movable from a ready position at a right of the installation through at least one exposure position and to a left side loading position. The cassette carriage has two clamping jaws disposed parallel to each other in a regulating plane, the jaws being two-dimensionally displaceable relative to each other in the regulating plane. The carriage further has a detent for fixing the position of the X-ray film cassette in the longitudinal direction of the clamping jaws. The clamping jaws are urged against each other in the right side loading position by a bias spring, and are urged apart in the left side loading position. A clamping slide having a projection extending into the regulating plane of the device between the clamping jaws is moveable within the cassette carriage in the longitudinal direction of the clamping jaws.

14 Claims, 2 Drawing Figures

TARGET DEVICE FOR AN X-RAY EXAMINATION INSTALLATION

BACKGROUND OF THE INVENTION

1. Field of the Invention

The present invention relates to a target device for an X-ray examination installation, and in particular to a target device which permits loading of an X-ray film cassette in the device from either the left or the right side.

1. Description of the Prior Art

Conventional targets for X-ray examination installations generally exhibit a luminescent screen aligned with the radiation cone, which is usually a component of an X-ray image intensifier. Such conventional devices also include a radiation-protected ready position for an X-ray film cassette which, as viewed by a person standing in front of the device, is generally situated at the right of the device next to the luminescent screen. As needed, such as when a finding to be documented is observed during radioscopy, the X-ray film cassette can be introduced into the radiation cone by operating a control button which causes the cassette to be moved from the ready position to an exposure position within the radiation cone, situated directly in front of the luminescent screen in the direction of radiation propogation. For this purpose, the X-ray film cassette is generally clamped in a cassette carriage which is motor driven from the ready position into a variety of exposure positions, and subsequently returned to the ready position.

After the film in the X-ray film cassette is exposed, the cassette carriage together with the X-ray film cassette is transported back to the ready position. The target device housing is generally open in a direction toward the attendant or operator in the area of the ready position. The X-ray film cassette in the ready position can therefore generally be obliquely placed from the top onto the lower horizontal clamping jaw and, by the application of downward pressure, is inserted below the upper clamping jaw, which is generally parallel to the aforementioned horizontal clamping jaw. If a physician is operating the machine, the physician is normally situated to the left of the exposure position in order to obtain better accessibility to the patient as well as to be in a convenient position for operating the X-ray installation controls. In conventional devices when the X-ray film cassette disposed in the cassette carriage must be replaced with another cassette with an unexposed sheet of film, the physician (if no assistant is available) must move around the bulky X-ray image intensifier disposed in front of the exposure position in order to change the X-ray film cassette in the ready position. Such movement is inconvenient and time consuming.

One attempted solution to the above-described problem is an X-ray examination unit wherein the target device has a cassette insertion slot located at its front edge at the left side next to the exposure position, by means of which changing of the X-ray film cassette can be achieved. For this purpose, the cassette carriage employed for transporting the X-ray film cassette from the ready position to the various exposure positions is able to be further transported from the ready position beyond the exposure position to a left side loading position. A disadvantage of such installations, however, is that the front side of the new X-ray film cassette cannot be inserted without difficulty from the left through the cassette insertion slot between the clamping jaws of the cassette carriage. This is because the jaws are necessarily urged together such that a small spacing remains between the jaws by means of a tension spring. This requires the physician to pull the lower clamping jaw with one hand and to insert the X-ray film cassette into the slot between the two clamping jaws up to the detent with his or her other hand. Only then can the lower clamping jaw be released. This maneuver requires the physician to release the command arm and other controls for the X-ray installation and to direct his or her attention entirely to the removal of the old cassette and insertion of the new X-ray cassette.

Another X-ray examination installation is described in German AS 2 333157 wherein interchanging the X-ray film in the ready position, for example by right side loading, is entirely eliminated and the cassette can only be loaded from the left side. For this purpose the clamping jaws are urged apart by means of a spring. A further tension spring is secured to the clamping jaws and forces the jaws against the newly-inserted X-ray film cassette as soon as the tension spring is tensed upon insertion of the X-ray film cassette into the cassette carriage. Although left side loading is facilitated in this X-ray examination means, right side loading is omitted altogether.

SUMMARY OF THE INVENTION

It is an object of the present invention to provide an X-ray examination installation which permits loading from eitther the right or left side thereof.

It is a further object of the present invention to provide such an X-ray installation wherein loading of an X-ray film cassette in the device can be undertaken with one hand both from the right as well as from the left side.

Another object of the present invention is to provide such an X-ray examination installation which permits shadow-free monitoring and storage of the image during exposure by means of the image intensifier video chain.

The above objects are inventively achieved in an X-ray target device wherein the clamping jaws, by means of at least one spring, are urged together at the right side loading position and are urged apart at the left side loading position. This permits X-ray film cassettes to be changed with one hand in both the right side ready position and in the left side loading position. In the ready position, at the right of the exposure position, insertion of the X-ray film cassette can be undertaken obliquely from the top onto the lower clamping jaw with depression of the same jaw when the clamping jaws are urged together by means of spring tension. When loading from the left, the X-ray film cassette can be inserted with one hand into the insertion slot because the clamping jaws at the left side loading position are urged apart and therefore exposed to the full slot width.

In a further embodiment of the invention, a clamping slide having a projection extending into the clamping plane of the film cassette and extending between the clamping jaws is positioned so as to be displaceable in the cassette carriage in the longitudinal direction of the clamping jaws. During exposure, the clamping slide may be entirely withdrawn from the radiation cone so that shadow-free observation and storage of the exposure by means of the image intensifier video chain is unimpaired. At the same time, the clamping jaws can be controlled by means of the clamping slide in a versatile manner.

A further embodiment of the invention makes use of the clamping slide to urge the clamping jaws toward one another against the force of a spring which normally biases the jaws apart as the clamping slide is moved from its extreme left position. The X-ray film cassette pushes the clamping slide in front of it as it is inserted, thereby producing the necessary clamping tension of the clamping jaws.

In a further embodiment, the clamping slide is pulled to its extreme left position by means of tension springs. The clamping slide in this embodiment in thus, without significant additional structural, is always urged toward its extreme left position. This can be exploited to aid both the left side loading operation, with opened clamping jaws, and for tensioning the X-ray film cassettes outside of the left side loading position.

In a further embodiment of the invention the clamping jaws are connected to the clamping slide by means of respective tension members conducted over a deflection roller biased by a spring. This offers the advantage that the regulating distance of the springs with a given length compensation is significantly reduced as a result of the simultaneous extension of the two ends of the tension member, and thus the length of the device can be significantly reduced. This also permits clamping of film cassettes of different sizes.

DESCRIPTION OF THE PREFERRED EMBODIMENTS

Figure 1:
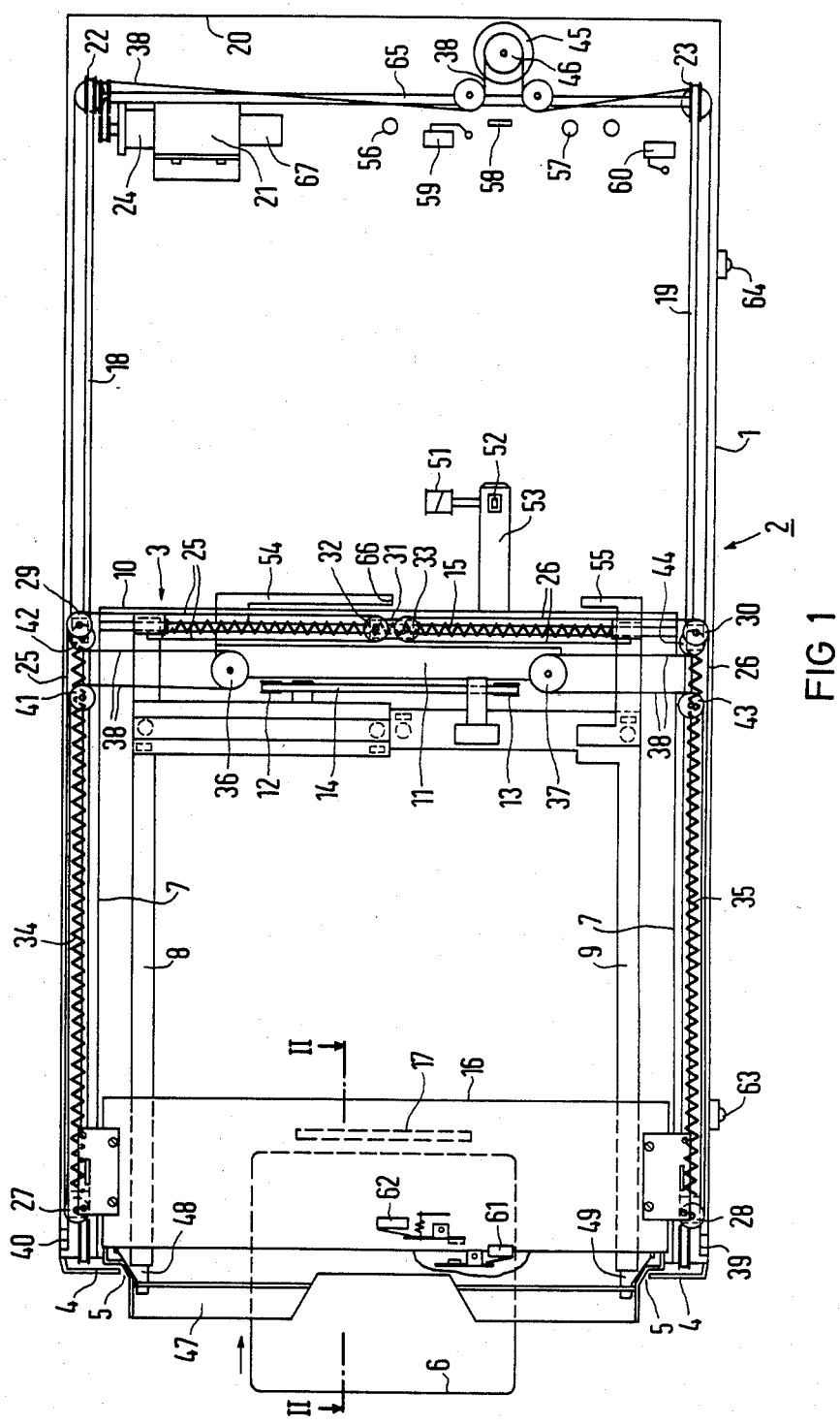
FIG. 1 is a sectional view of a target device constructed in accordance with the principles of the present invention having a cassette carriage displaceable therein.

A simplified illustration of a target device for an X-ray examination installation constructed in accordance with the principles of the present invention is shown in FIG. 1 depicting only those components necessary to describe the invention claimed herein. The X-ray target device 2 has a housing 1 with a cassette carriage 3 displaceable therein from a ready position, generally at the right of FIG. 1 through an exposure position, and to a left side loading position, at the extreme left of FIG. 1. The cassette carriage 3 is shown in FIG. 1 arrested at the left side loading position. The X-ray target device 2 has an insertion opening 5 at a left front side 4 of the housing 1, through which an X-ray film cassette 6 can be inserted into the cassette carriage 3 situated at the left side loading position. The cassette carriage 3 has a U-shaped frame 7 which is open toward the insertion opening 5 for the X-ray film cassette 6. The cassette carriage 3 carries two clamping jaws 8 and 9 aligned parallel to one another and disposed perpendicularly to the insertion opening 5. The jaws 8 and 9 are displaceable relative to one another. For this purpose, the clamping jaws have a telescoping connection at the center leg 10 of the frame 7. Additionally, a so-called low-lift truck 11 is also displaceably seated on the center leg 10 of the frame 7. The truck 11 carries two pulleys 12 and 13 about which a belt 14 is trained. The two ends of the belt 14 are respectively connected to the clamping jaws 8 and 9. The clamping jaws 8 and 9 are urged apart by a compression spring 15 disposed parallel to the center leg 10 of the frame 7.

A clamping slide 16 extends parallel to the center leg 10 of the cassette carriage 3 at the two edges thereof which are parallel to the clamping jaws 8 and 9. The clamping slide 16 is mounted so as to be longitudinally displaceable in a manner not illustrated in greater detail as is known to those skilled in-the art. The clamping slide 16 is displaceable in a plane which is parallel and directly adjacent to the plane defined by the two clamping jaws 8 and 9. The clamping slide 16 carries an angular cassette detent 17, which depends into the clamping plane for the X-ray film cassette 6 between the two clamping jaws 8 and 9. The clamping slide 16 is secured to two toothed belts 18 and 19 at opposite sides thereof disposed at the frame 7. The toothed belts 18 and 19 extend parallel to the clamping jaws 8 and 9 along the entire upper and lower sides of the housing 1 of the target device 2. The toothed belts 18 and 19 are conducted around respective toothed-belt pulleys 22 and 23 which are driven by a motor 21 at an end face 20 of the target device 2 which is opposite to the left side cassette insertion opening 5. An electro-mechanical transducer 24, which converts the angle of rotation of the toothed-belt pulleys 22 and 23 into electrical signals, is coupled to the motor 21.

The clamping slide 16 is also secured to respective terminate tension members 25 and 26 at its opposite ends. The tension members 25 and 26 are respectively connected to the clamping jaw adjacent thereto. The tension member 25 is connected to the clamping jaw 8. by means of a belt trained around a spring-loaded deflection roller 27, disposed at the free end of one of the legs of the U-shaped frame 7, the belt continuing around a fixed deflection roller 29 disposed at a corner of the U-shaped frame 7, and around a free roller 32 disposed at a central portion of the center leg 10. The tension member 26 is connected to the clamping jaw 9 by means of a belt trained about a spring-loaded deflection roller 28 disposed at a free end of the other leg of the U-shaped frame 7, the belt continuing around a fixed deflection roller 30 disposed at the other corner of the U-shaped frame 7, and a free roller 33 disposed at the central portion of the center leg 10. The free rollers 32 and 33 are connected by flat stock 31. The deflection rollers 27 and 28 disposed at the free ends of the legs of the U-shaped frame 7 of the cassette carriage are displaceable along the respective legs in a manner not shown in greater detail on FIG. 1 which is known to those skilled in the art. The rollers 27 and 28 are biased by respective compression springs 34 and 35 in the direction toward the respective free end of the leg of the frame 7 on which the roller is mounted.

In additional to the two pulleys 12 and 13 for the belt 14, the truck 11 also carries toothed belt pulleys 36 and 37 at its upper end and lower end for another toothed belt 38. One free end of the belt 38 is secured at the lower left edge of the target device housing 1 at 39. The belt 38 is conducted below the cassette carriage 3 to the right end face 20 of and is then conducted to the upper right corner and from there to the upper left corner, where it is secured to a contact point 40 of the housing 1 the target device 2. The belt 38 is conducted around toothed belt pulleys 41 and 42 disposed at one side of the truck 11 on opposite sides of the pulley 36, and is also conducted around toothed belt pulleys 43 and 44 disposed on the opposite side of the truck 11 on each side of the pulley 37. The belt 38 is also trained around a toothed belt pulley 46 driven by a lifting motor 45, the pulley 46 being non-displaceably seated in the housing 1 of the target device 2.

The insertion opening 5 of the housing 1 can be closed by a loading flap 47. The flap 47 is pivotally seated above and below the insertion opening. The ends of the clamping jaws 8 and 9 facing the insertion opening 5 respectively carry detents 48 and 49 for the film cassette 6 clamped between the jaws 8 and 9. The detents 48 and 49 may be pivoted out of the clamping plane defined by the two clamping jaws 8 and 9. For this purpose, the detents 48 and 49 are pivotally mounted on an axis at the clamping jaws 8 and 9, the axis being substantially parallel to the axis about which the loading flap 47 pivots. The detents 48 and 49 each carry projections 50 (one of of which may be seen in FIG. 2) by means of which the detents enter into the profile of the closed loading flap 47 when the cassette carriage 3 enters the loading position.

As can be seen in FIG. 1, a latch 52 controlled by an electromagnet 51, mounted to the housing 1 in the area of the ready position, is engageable with a perforated tongue 53 secured to the cassette carriage when the cassette carriage 3 is situated in the left side loading position. The truck 11 has cover plates 54 and 55 which move into the light path of at least one light beam when the cassette carriage 3 is moved to the ready position. Photodetectors 56 and 57 are built into the housing 1 of the target device 2 with the light source or sources for generating the light beam being carried on another component and thus not shown in FIG. 1. In the ready position, the cassette carriage 3 presses against a permanent magnet detent 58 with the tongue 53. Also in the ready position limit switches 59 and 60 are respectively engaged with the clamping slide 16 and the cassette carriage 3.

Figure 2:
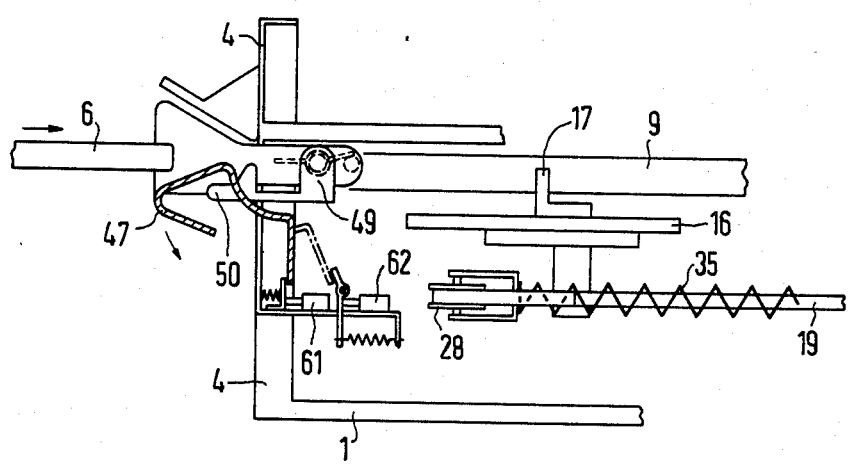
FIG. 2 is a sectional view taken along line II—II of FIG. 1.

As shown in FIGS. 1 and 2, two further switches 61 and 62 are secured in the housing 1 of the target device 2 at the side of the insertion opening 5. The switch 62 is actuated when the loading flap 47 is completely opened, and the other switch 61 is actuated when the flap 47 is completely closed. A push button 63 for the left side loading and a push button 64 for right side loading are also mounted at the lower edge of the housing 1.

When the motor 21 is switched on, for example, by pressing the push button 63 or the push button 64, both the upper and lower toothed belt pulleys 22 and 23 for the toothed belts 18 and 19 (ridgidly coupled to one another by means of an axle 65) are synchronously driven and the clamping slide 16 secured to the belts 18 and 19 is displaced at a right angle relative to the X-ray target device 2, that is, from left to right or right to left in FIG. 1. Because the clamping slide 16 is also connected via the two tension members 25 and 26 to the clamping jaws 8 and 9, which are biased apart by the compression spring 15, the clamping slide 16 is pulled to the extreme left position of the cassette carriage 3 in FIG. 1 so that the entire cassette carriage 3, insofar as it is not arrested, is displaced in the target device 2. Thus, the cassette carriage 3 having the X-ray film cassette 6 clamped therein can be displaced from the left side loading position to the right side ready position and through the intervening exposure positions, and back. When, however, the cassette carriage 3 has been introduced into the left side loading position and been arrested in that position by means of the latch 52, the motor 21 will only be able to displace the clamping slide 16 within the confines of the cassette carrier 3.

When the cassette carrier 3 has been transported to the left side loading position, the motor 21 is switched off by operation of the transducer 24 and the latch 51 is engaged with the tongue 53 of the carriage 3, thus arresting the cassette carriage 3 in the loading position. In the left side loading position, the projections of the detents 48 and 49 pivotally seated at the clamping jaws 8 and 9 drop, as shown in FIG. 2, behind the sheet metal profile of the loading flap 47, which is held closed by spring power.

When the loading flap is subsequently opened, this action presses the detents 48 and 49 out of the insertion plane of the film cassette 6 defined by the clamping jaws 8 and 9. Consequently, the X-ray film cassette 6 clamped between the clamping jaws 8 and 9 can be removed and/or a new X-ray cassette 6 can be inserted between the jaws 8 and 9, which are spread apart by the compression spring 15. The opened loading flap 47 simultaneously activates the limit switch 62. The switch 62 switches the motor 21 on (the motor 21 having previously been arrested during standstill by means of a magnetic brake 67) such that the motor 21 operates to pull the clamping slide 16 toward the left, and thereby ejects the X-ray film cassette out of the insertion 5 by means of the cassette detent 17. The motor 21 is turned off by operation of the transducer 24 when the clamping slide 16 has reached a pre-programmed extreme left position.

When a new X-ray film cassette 6 is inserted between the clamping jaws 8 and 9, the cassette 6 pushes against the cassette detents 17 of the clamping slide 16, thereby pushing the clamping slide 16 in front of the cassette without the arrested cassette carriage 3 being moved from its left side loading position. The clamping slide 16 is thus displaced toward the right in the cassette carriage 3 upon insertion of the film cassette 6 as shown in FIG. 1. The two clamping jaws 8 and 9 connected to the clamping slide 16 via the two tension members 25 and 26 are also displaced from their wide open position against the force of the compression spring, the jaws 8 and 9 being displaced toward one another until they are seated against the inserted X-ray film cassette 6. As soon as the two clamping jaws 8 and 9 are seated against the X-ray film cassette 6, and can no longer be pressed further together, the upper and lower compression springs 34 and 35 are pressed back by the deflection rollers 27 and 28, over which the tension members 25 and 26 are conducted, because the two tension members 25 and 26 connected to the clamping jaws 8 and 9 remain in the same position even given further introduction of the X-ray film cassette 6, that is, given further displacement of the clamping slide 16 and the cassette carriage 3. As a consequence of the deflection of the two tension members 25 and 26 around the upper and lower deflection rollers 27 and 28, the compression springs 34 and 35 need only be compressed by approximately half a normal path length unit, wherein a full path length unit is defined by the amount of displacement of the clamping slide 16. This construction not only shortens the structural length of the compression springs 34, and 35 but also reduces the differences in clamping forces experienced by large and small X-ray film cassettes.

Upon insertion of the new X-ray film cassette 6, the clamping slide 16 is manually displaced toward the right and thus the electro-mechanical transducer 24 is displaced by one-quarter revolution, so that the motor 21 is switched on in the same rotational sense.

The engaged motor 21 promotes insertion of the X-ray film cassette 6 and shuts off as soon as the clamping slide reaches the extreme right position in the cassette carriage after a path length prescribed by the transducer 24. When the loading flap 47 is subsequently closed after insertion of the film cassette 6, the switch 61 is again closed and causes the motor 21 to again become engaged, this time in the opposite rotational sense. The operation of the motor 21 pushes the clamping slide 16 back toward the left and thereby pushes the chucked film cassette 6 against the detents 48 and 49, now situated in their work position. The motor 21 is switched off by means of a time function element (not shown). The X-ray film cassette 6 is now clamped between the jaws 8 and 9 and is pressed against the clamping jaws by the compression springs 34 and 35, which urge the deflection rollers 27 and 28 and the clamping slide 16 toward the left against the detents 48 and 49. At the same that the motor is shut off, the time function element initiates release of the latch 52 for the cassette carriage 3, causes reversal of the rotational sense of the motor 21, and the carriage 3 is returned to the ready position. At the ready position, the cassette carriage 3 is arrested at the permanent magnet detent 58 and the switch 59 is actuated. The motor 21 is only shut off, however, when the clamping slide 16 is shut off via the limit switch 60 in the housing 1 when the slide 16 has reached the extreme right position in the cassette carriage 3.

During this return sequence up to the actuation of the switch 59, the regulating path of the clamping slide 16 is measured by means of the transducer 24 and the measured result, corresponding to the cassette width is employed for determining the transport path from the ready position to the various exposure positions, as described in German patent application P 3138911.2. The measuring operation by means of the transducer 24 for the dimension corresponding to the cassette width is terminated by means of the switch 59, which also shuts off the motor 21. After the motor 21 ceases operation, when the cassette carriage 3 and the clamping slide 16 have reached their right side final positions controlled by the limit switches 58 and 61, the truck 11 is lifted by the motor 45 if the photodetector 56 is covered by the edge 66 of the cover plate 54 until the signal of the photodetector 56 changes, that is, until the centering edge 66 uncovers the photodetector 56. The truck 11 is lowered if the edge 66, when the carriage 3 reaches the right side final position, does not block the photodector 56, until the edge 66 covers the photodetector 56. The truck 11 is then centered as to height. As a result of the connection of the two clamping jaws 8 and 9 to the end sections of the belt 14 secured to the truck 11, the film cassette 6 clamped between the jaws 8 and 9 is thus also centered as to height at the same time. The coverage or non-coverage of the light barrier 57 by the cover plate 55 coupled to the clamping jaw 9 then produces a code signal for the cassette height which may be subsequently used in a manner not further described herein for regulating the path of the truck 11 given sub-divided exposures.

If a finding which is to be documented is observed during radiography, the cassette carriage 3 disposed in the ready position can be transported by the same motor 21 into one or more exposure positions, as described in the aforementioned German patent application P 3138911.2. Given sub-divided exposures, the clamping jaws 8 and 9, in combination with the truck 11, are displaced by means of the motor 45 which pulls the truck 11 up or down over the toothed belt 38 whose two ends are secured to the housing 1. The truck 11 is displaced such that only the upper or lower half of the film cassette 6 is aligned with the radiation cone.

After exposure of the sheet of X-ray film in the X-ray film cassette 6, the cassette 6 may be changed to the ready position, that is, at the right side of the device 2 in FIG. 1, or moved to the left side loading position. When the film cassette 6 is to be moved to the ready position, the right side pushbutton 64 is depressed. As a result the motor 21 is switched on in a rotational sense which pulls the clamping slide 16 toward the right as shown in FIG. 1, that is, toward the right in the cassette carriage 3 pushing against the right side detent 59 until the clamping slide 16 actuates the limit switch. In this position, the motor 21 is arrested by the magnetic brake 67. The film cassette 6 can now be changed by manually depressing the lower clamping jaw 9. This can be undertaken such that the chucked X-ray film cassette is pressed down and thereby downwardly displaces the lower clamping jaw 9. As a result of the coupling to the belt 14, the upper clamping jaw 8 is displaced upward so that the film cassette 6 can be withdrawn perpendicularly to the plane of the drawing of FIG. 1. The new X-ray film cassette 6, provided with a sheet of film, is then inserted over the same path into the cassette carriage 3 situated in the ready position. For this purpose the new cassette is placed on the lower clamping jaw 9 from the front, that is, perpendicular to the plane of the drawing, and by pressing the clamping jaw 9 downwardly is pushed under the upper clamping 8. After this has occurred, the right side pushbutton 64 is again depressed, which initiates the center positioning for the film cassette 6 described above in conjunction with the left side loading.

It is also possible to change the X-ray film cassette in the left side loading position. For this purpose, the left side pushbutton 63 is depressed. This begins operation of the motor 21 in a rotational sense which is the same as when the cassette carriage 3 is transported to the extreme left side position in FIG. 1, the left side loading position. After the loading flap 47 has been pivoted open such that the detents 48 and 49 of the jaws 8 and 9 are engaged in positive lock with the loading flap 47 in the loading position and the switches 61 and 62 are actuated, the film cassette 6 as already described, is pushed out of the cassette carriage 3 by the clamping slide 17. Introduction of a new X-ray film cassette 6 can then be undertaken in the manner described above. The motor 21 is switched off by the switch 61 associated with the loading flap 47 in order to exclude premature opening of the loading flap 47.

Although modifications and changes may be suggested by those skilled in the art, it is the intention of the inventors to embody within the patent warranted hereon all changes and modifications as reasonably and properly come within the scope of their contribution to the art.

We claim as out invention:

1. A target device for an X-ray examination installation comprising:
    a cassette carriage;
    means for moving said cassette carriage relative to an X-radiation cone from a right ready position through at least one exposure position to a left loading position and back for left and right side loading of an X-ray film cassette therein;

two opposed clamping jaws disposed parallel to one another carried on said cassette carriage, said clamping jaws being two-dimensionally displaceable relative to one another for adjustment in a common plane for receiving and retaining said X-ray film cassette therebetween;

at least one detent carried on said cassette carriage for fixing the position of said X-ray film cassette in the longitudinal direction of said clamping jaws;

a clamping slide carried on said cassette carriage and having a projection extending into said common plane of said clamping jaws, and means for moving said clamping slide relative to said carriage in said longitudinal direction of said clamping jaws;

a pair of tension members respectively interconnected between said clamping slide and said clamping jaws, said tension members being respectively conducted over deflection rollers, said deflection rollers being respectively urged by bias springs in a direction opposing movement of said clamping slide toward the right of said carriage;

a motor drivingly connected to said clamping slide for transporting said clamping slide from an extreme left position to an extreme right position relative to said cassette carriage, said clamping slide being transported by said motor against the force of said bias springs normally biasing said clamping slide towards said extreme left position; and at least one spring interconnected between said clamping jaws for biasing said clamping jaws toward each other at said right loading position and for spreading said clamping jaws apart in said left loading position, said clamping slide disposed relative to said clamping jaws for forcing said clamping jaws toward one another against the force of said spring which normally spreads said clamping jaws apart at said left loading position, as said clamping slide is moved from said extreme left position relative to said cassette carriage.

2. The target device of claim 1, further comprising a pair of springs for normally biasing said clamping slide toward said extreme left position.

3. The target device of claim 1 wherein said motor is additionally drivingly connected to said cassette carriage for operating as said means for moving said cassette carriage from said ready position through said exposure position to said left loading position.

4. The target device of claim 1 further comprising a means for arresting movement of said cassette carriage upon arrival of said cassette carriage at said left loading position.

5. The target device of claim 4 wherein said means for arresting said movement of cassette carriage is an electro-magnetically controlled latch.

6. The target device of claim 4 wherein said means for arresting movement of said cassette carriage is a magnetic clamp 7. The target device of claim 1 wherein said target device has a left side insertion opening for left loading of an X-ray film cassettte in said target device, and further comprising a pair of detents respectively pivotably mounted on said clamping jaws, each of said detents being pivotable into and out of said plane of said clamping jaws.

8. The target device of claim 1 wherein said target device has a left side insertion opening for left loading of said X-ray film cassette, and further comprising a loading flap for covering said insertion opening and a detector means for electronically detecting whether said loading flap is open or closed.

9. The target device of claim 8 further comprising a means connected to said detector means for moving said clamping slide for ejecting said X-ray film cassette out of said insertion opening when actuated by said detector means.

10. The target of claim 1 further comprising a means connected to said motor and engageable with said clamping slide such that when said clamping slide is displaced said motor is switched on in a rotational direction corresponding to the direction of displacement of said clamping slide.

11. The target device of claim 1 further comprising a pair of detents respectively connected to said clamping jaws, said detents being pivotably mounted on said clamping jaws into and out of said plane of said clamping jaws, and a means for determining the amount of displacement of said clamping slide from an extreme right position relative to said cassette carriage up to engagement with said detents, and a means for utilizing said length measurement for calculating the width of said X-ray film cassette.

12. The target device of claim 1 further comprising at least one plate carried on one of said clamping jaws for co-movement therewith and a light barrier disposed in the path of movement of said plate for sensing the height of a cassette retained between said clamping jaws.

13. The target device of claim 1 further comprising a height-adjustable carrier connected to said clamping jaws by a toothed belt for adjusting the position of said clamping jaws relative to one another.

14. The target device of claim 13 wherein said height-adjustable carrier has a plate co-movable therewith, and wherein said target device further comprises a light barrier disposed in the path of movement of said plate, and further comprising a motor connected to said height adjustable carrier controlled by said light barrier, said motor being switched on depending upon coverage or uncoverage of said light barrier by said plate in a rotational sense for displacing said plate toward said light barrier, said motor being shut off by said light barrier upon a change in a signal from said light barrier.

* * * * *